United States Patent
Ramchandani

(10) Patent No.: US 8,239,476 B2
(45) Date of Patent: Aug. 7, 2012

(54) NETWORK ALARM MESSAGE PROCESSING SYSTEMS AND METHODS

(75) Inventor: Amit Ramchandani, Woburn, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 238 days.

(21) Appl. No.: 12/640,710

(22) Filed: Dec. 17, 2009

(65) Prior Publication Data

US 2011/0153766 A1  Jun. 23, 2011

(51) Int. Cl.
    *G06F 15/16* (2006.01)
(52) U.S. Cl. ........ 709/207; 709/202; 709/203; 709/244; 709/246
(58) Field of Classification Search .................. 709/207, 709/202, 203, 244, 246
    See application file for complete search history.

(56) References Cited

U.S. PATENT DOCUMENTS

| 6,032,147 | A  | * | 2/2000  | Williams et al. .......... 1/1 |
| 2004/0246120 | A1 | * | 12/2004 | Benner et al. .......... 340/506 |
| 2006/0161946 | A1 | * | 7/2006  | Shin .......... 725/33 |
| 2008/0048851 | A1 | * | 2/2008  | Reyes et al. .......... 340/506 |
| 2008/0181377 | A1 | * | 7/2008  | Qiu et al. .......... 379/93.24 |
| 2010/0153583 | A1 | * | 6/2010  | Harris et al. .......... 709/246 |

* cited by examiner

*Primary Examiner* — Lan-Dai T Truong

(57) ABSTRACT

Exemplary network alarm message processing systems and methods are disclosed. In an exemplary method, a network alarm message processing system receives a network alarm message provided by a network element of a wide area network, the network alarm message being in a first message format, converts the network alarm message in the first message format to a new network alarm message in a network universal message format, and provided the new network alarm message for use in conducting surveillance of the wide area network. In certain embodiments, the conversion may be based on a mapping data file and a translation rules data file associated with the first message format Corresponding systems and methods are also disclosed.

15 Claims, 13 Drawing Sheets

| Message Attribute | Type | Description |
|---|---|---|
| EMSIP | STRING | Element Management System IP address |
| NETID | STRING | Network Element Target Identifier or IP address |
| ALARMSOURCE | SHORT | Type of Network Element (OLT, ATM, EDFA, etc) |
| SUBNEADDRESS | STRING | Affected Entity Details |
| SEVERITY | SHORT | (1=Critical,2=Major,3=Minor,4=Info,5=Clear) |
| ATAG | LONG | Tagged Value |
| AIDTYPE | STRING | Type of AID |
| AID | STRING | Access Identifier of the Affected Object |
| GENERATIONTIME | LONG | System Time in milliseconds when the alarm received in system |
| CONDTYPE | STRING | Condition Type Code of the Alarm |
| DESC | STRING | Description of the Alarm |
| SERVICEAFFECT | BOOLEAN | Service Affecting (Y/N) |
| LOCATION | STRING | Vendor Unique Location/ID |
| DIRECTION | STRING | Internal Field |
| CATEGORY | SHORT | 1= Alarm, 2= Event |
| RAWMSGID | STRING | Message Unique ID |

Fig. 5

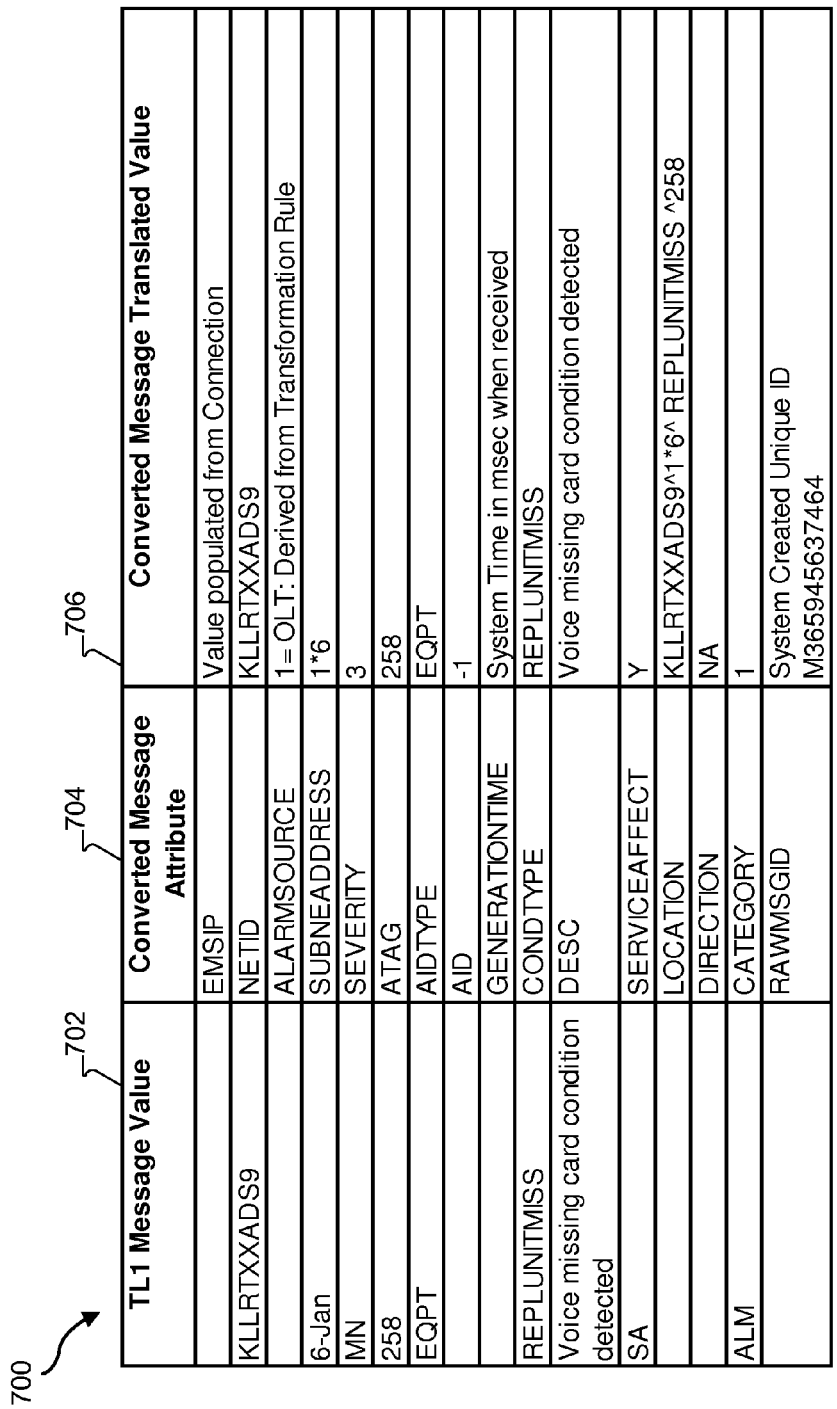

| TL1 Message Value | Converted Message Attribute | Converted Message Translated Value |
|---|---|---|
| | EMSIP | Value populated from Connection |
| KLLRTXXADS9 | NETID | KLLRTXXADS9 |
| | ALARMSOURCE | 1 = OLT: Derived from Transformation Rule |
| | SUBNEADDRESS | 1*6 |
| 6-Jan | SEVERITY | 3 |
| MN | ATAG | 258 |
| 258 | AIDTYPE | EQPT |
| EQPT | AID | -1 |
| | GENERATIONTIME | System Time in msec when received |
| REPLUNITMISS | CONDTYPE | REPLUNITMISS |
| Voice missing card condition detected | DESC | Voice missing card condition detected |
| SA | SERVICEAFFECT | Y |
| | LOCATION | KLLRTXXADS9^1*6^ REPLUNITMISS ^258 |
| | DIRECTION | NA |
| ALM | CATEGORY | 1 |
| | RAWMSGID | System Created Unique ID M365945637464 |

Fig. 7

```
<package id="9826">
    <date>2009.09.28:07.23.57:384</date>
    <source>106.40.5.47</source>
    <alarmUnit assoc="3076" uid="3078" id="1571">
        <date>2009.09.28:07.30.07:000</date>
        <alarm description="DHCP Failure: No IP lease" value="cleared" type="REMOVED">
            <property value=" BLTMMDYKMT205001302B " name="tid"/>
            <property value="5-1-5-ONT " name="aid"/>
            <property value="ont1000v" name="type"/>
            <property value="CLEARED" name="severity"/>
            <property value="SA" name="svcAffecting"/>
            <property value="FaultService" name="source"/>
            <property value="VOIP" name="secMod"/>
            <property value="DHCPFAIL-NL" name="condCode"/>
            <property value="" name="USERID"/>
            <property value="173" name="TYPEID"/>
        </alarm>
    </alarmUnit>
</package>
```

Fig. 8

| XML Message Value | Converted Message Attribute | Converted Message Translated Value |
|---|---|---|
| 106.40.5.47 | EMSIP | 106.40.5.47 |
| BLTMMDYKMT205001302B | NETID | BLTMMDYKMT205001302B |
|  | ALARMSOURCE | 2= ONT: Derived from Transformation Rule |
| 5-1-5-ONT | SUBNEADDRESS | 1*5*1*5 |
| CLEARED | SEVERITY | 5 |
| 173 | ATAG | 173 |
| VOIP | AIDTYPE | VOIP |
| 5-1-5-ONT | AID | ONT |
|  | GENERATIONTIME | System Time in msec when received |
| DHCPFAIL-NL | CONDTYPE | DHCPFAIL-NL |
| DHCP Failure: No IP lease | DESC | DHCP Failure: No IP lease |
| SA | SERVICEAFFECT | Y |
| uid="3078" | LOCATION | 3078 |
|  | DIRECTION | NA |
| alarmUnit | CATEGORY | 1 |
|  | RAWMSGID | System Created Unique ID M365945637896 |

Fig. 9

```
Agent address: 172.24.28.0
    Enterprise: sampleEnterprise
    OID Name: TelcoAlarm
    Binding #1: TrapLogSequence = 5
    Binding #2: TrapLogSeverity = major(2)
    Binding #3: TrapLogState = alarm(1)
    Binding #4: almLabel.0.3.4 = Ps1+24
    Binding #5: almIndex.0.3 = 4
    Binding #6: TrapLogText = Module=Fan Tray, Model=5010
    Binding #7: chassisID.0.3 = 1
    Binding #8: slotID.0.3 = 3
    Binding #9: moduleCLLIcode.0.3 = FantrayCLLI123456789
    Binding #10: moduleCLEIcode.0.3 = FantrayCLEI123456789
    Binding #11: TrapLogTime = 2005-11-2,1:49:38.77
```

NETWORK ALARM MESSAGE PROCESSING SYSTEMS AND METHODS

BACKGROUND INFORMATION

Management of wide area networks is complex, especially for wide area networks that employ network elements provided by different vendors. For example, network elements provided by different vendors typically output messages in different formats. Consequently, a network management system ("NMS") of a wide area network must be configured to process messages in all of the different formats used by the network elements in the wide area network. In order to add a new network element that supports a new message format to a wide area network or in order to modify an existing message format, significant work must be performed to reconfigure the NMS to process messages in the new or modified message format. This typically involves significant work by operators of the NMS and may include interrupting normal operation of the wide area network to take down the NMS to install updated software, middleware, and/or firmware code.

To illustrate, a wide area network typically includes network elements that employ different message formats for alarm messages. Consequently, a network surveillance application in an NMS must be able to interpret alarm messages in all of the alarm message formats employed by the network elements. This is inconvenient and burdensome for operators of the network management system, especially when the NMS, including the network surveillance application, must be reconfigured to support a new or modified alarm message format.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 5 illustrates a table defining an exemplary network universal message format.

FIG. 7 illustrates a table showing an exemplary mapping of the TL1 message of FIG. 6 to the network universal message format of FIG. 5.

FIG. 8 illustrates an exemplary Extensible Markup Language ("XML") formatted message.

FIG. 9 illustrates a table showing an exemplary mapping of the XML message of FIG. 8 to the network universal message format of FIG. 5.

FIG. 10 illustrates an exemplary Simple Network Management Protocol ("SNMP") formatted message.

DETAILED DESCRIPTION OF PREFERRED EMBODIMENTS

Exemplary network alarm message processing systems and methods are described herein. In certain embodiments, network alarm messages in various network alarm message formats may be output by network elements in a wide area network. The network alarm messages may be received and converted from network alarm messages in various message formats to new network alarm messages defined in accordance with a network universal message format. The new network alarm messages in the network universal message format may be provided for use in one or more network management operations such as one or more operations for conducting surveillance of the wide area network. In certain embodiments, a network surveillance application configured to monitor one or more conditions of the wide area network may receive, interpret, and use the new network alarm messages in the network universal message format to conduct surveillance of the wide area network. Accordingly, the network surveillance application need not be configured to interpret various message formats used by the network elements of the wide area network, and management and upkeep of the network surveillance application is simplified.

In addition, certain exemplary systems and methods described herein may facilitate convenient and/or non-intrusive operator management of network management settings and/or operations. For example, certain systems and methods may facilitate updating of network management settings to add support for converting network alarm messages from a new network alarm message format to the network universal alarm message format. The updating may be accomplished without interruption to operations of the wide area network. For example, the updating may be accomplished without interrupting the conducting of surveillance of the wide area network by a network surveillance application. Exemplary network alarm message processing systems and methods will now be described in reference to the accompanying drawings.

Figure 1:
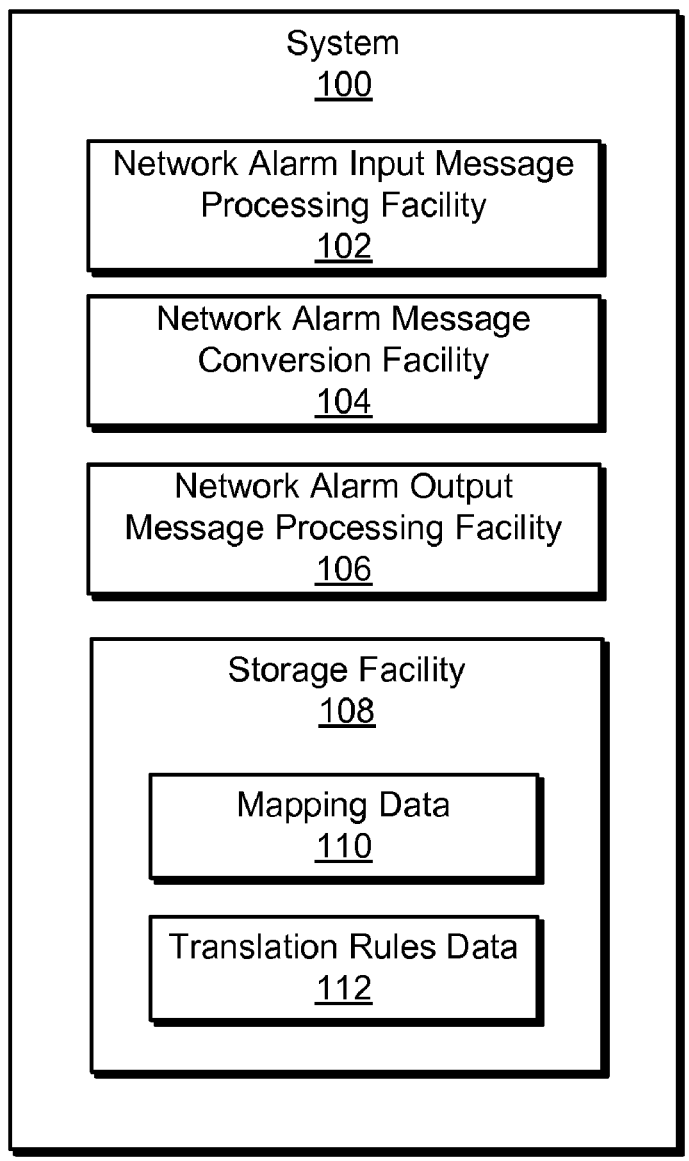
FIG. 1 illustrates an exemplary network alarm message processing system.

FIG. 1 illustrates an exemplary network alarm message processing system 100 (or simply "system 100"). As shown, system 100 may include, without limitation, a network alarm input message processing facility 102 (or simply "message input facility 102"), a network alarm message conversion facility 104 (or simply "conversion facility 104"), a network alarm output message processing facility 106 (or simply "message output facility 106"), and a storage facility 108 selectively and communicatively coupled to one another. Any suitable communication technologies, including any of the communication technologies mentioned herein, may be employed to facilitate communications between facilities 102-108. Each of these facilities will now be described in more detail.

Message input facility 102 may be configured to interface with and receive network alarm messages provided by a plurality of network alarm message sources. For example, message input facility 102 may be configured to receive network alarm messages provided by one or more network elements in a wide area network. Examples of wide area networks may include, but are not limited to, one or more mobile telephone networks (e.g., cellular telephone networks), wide area wireless networks (e.g., satellite media broadcasting networks or terrestrial media broadcasting networks), subscriber television networks (e.g., broadcast, multicast, and/or narrowcast television networks), subscriber communications networks (e.g., VoIP networks), satellite networks, cable networks, hybrid fiber coax networks, optical fiber networks (passive optical networks), fiber-to-the-premises networks, broadband networks, narrowband networks, and any other wide area networks. Examples of network elements may include, without limitation, routers, gateways, switches, optical cross-connect devices, optical amplifier devices (e.g., Erbium Doped Fiber Amplifiers ("EDFAs")), optical network terminals ("ONTs"), optical line terminals ("OLTs"), asynchronous transfer mode ("ATM") devices, and any other network devices in a wide area network. In some examples, one or more of the network elements in a wide area network may be vendor-specific and may output network alarm messages in various, heterogeneous, message formats.

Accordingly, the network alarm messages received by message input facility 102 may be formatted in accordance with one or more message formats. The message formats may include industry standard and/or vendor proprietary message formats. Examples of network message formats may include, but are not limited to, a Transaction Language 1 ("TL1") message format, an Extensible Markup Language ("XML") message format, and a Simple Network Management Protocol ("SNMP") message format. These examples are illustrative only. Additional or alternative network message formats may be provided by network elements of a wide area network and received by message input facility 102 in other examples. In certain embodiments, TL1 messages may be formatted in accordance with one or more industry standards as defined in Telcordia GR-831 and/or GR-833 standards documents, XML messages may be formatted in accordance with one or more industry standards as defined in XML 1.0 Specification by World Wide Web Consortium ("W3C"), and SNMP messages may be formatted in accordance with one or more industry standards as defined in Internet Engineering Task Force ("IETF") RFCs 3411-3418.

Message input facility 102 may employ any technologies suitable for providing an interface that facilitates communicating or otherwise interfacing with network alarm message sources such as network elements and/or element management systems corresponding to network elements. For example, message input facility 102 may employ one or more application program interfaces, signaling protocols, and/or other interfacing technologies to communicate with message sources. Message input facility 102 may be configured to support local and/or remote communications with message sources.

Message input facility 102 may be configured to perform preliminary processing of received network alarm messages. Preliminary processing may include any operations that may prepare network alarm messages for further processing.

In certain embodiments, message input facility 102 may be configured to map content of a received network alarm message to a plurality of fields of a defined network universal message format. For example, for a network alarm message that has been received in a particular network message format, message input facility 102 may parse the network alarm message and map the content of the network alarm message to fields of the network universal message format. Examples of such mappings are described in more detail further below.

Conversion facility 104 may be configured to convert network alarm messages defined in accordance with one or more message formats into new network alarm messages defined in accordance with a network universal message format. For example, conversion facility 104 may translate content of a network alarm message in a network message format and populate predefined fields of the network universal message format to generate a new network alarm message that is defined in accordance with the network universal message format. Conversion of a network alarm message from a particular message format to the network universal message format may be performed in any suitable way, including in any of the ways described herein. Examples of translations from certain message formats to the network universal message format are described in more detail further below.

Message output facility 106 may be configured to interface with and provide converted network alarm messages in the network universal message format to one or more destinations for further processing. For example, message output facility 106 may be configured to output one or more converted network alarm messages to a network surveillance application for use in conducting surveillance of a wide area network. Because the converted network alarm messages provided to the network surveillance application are in a uniform message format, the configuration of the network surveillance application may be simplified, as compared to conventional network surveillance applications configured to interpret various message formats, to process only a single, universal network alarm message format and may not be required to interpret network alarm messages defined in accordance with different message formats. Message output facility 106 may be configured to perform any suitable post-conversion processing of converted network alarm messages, including preparing the converted network alarm messages for transmission to a network surveillance application or other destination.

Storage facility 108 may be configured to store mapping data 110 and translation rules data 112. Conversions of network alarm messages from one or more various message formats to a network universal message format may be performed based on mapping data 110 and/or translation rules data 112. To this end, mapping data 110 may include any data specifying how content of one or more network alarm messages in one or more various message formats should be mapped to predefined fields of a network universal message format, and translation rules data 112 may include data specifying one or more rules to follow to translate specific instances and/or values of content within network alarm messages into values that may be used to populate the predefined fields of network universal alarm messages.

As an example, message input facility 102 may be configured to map content of a network alarm message received in a particular message format to fields of a network universal message format based on mapping data 110. Conversion facility 104 may then translate the content of the network alarm message based on translation rules data 112 to populate one or more of the fields of the network universal message format to generate a new network alarm message that is defined in accordance with the network universal message format.

In certain embodiments, mapping data 110 may include a mapping data file for each type of message format from which content of a received network alarm message may be mapped to fields of a network universal message format. Similarly, translation rules data 112 may include a rules data file for each type of message format from which content may be translated and used to populate fields of a network universal message format.

Figure 2:
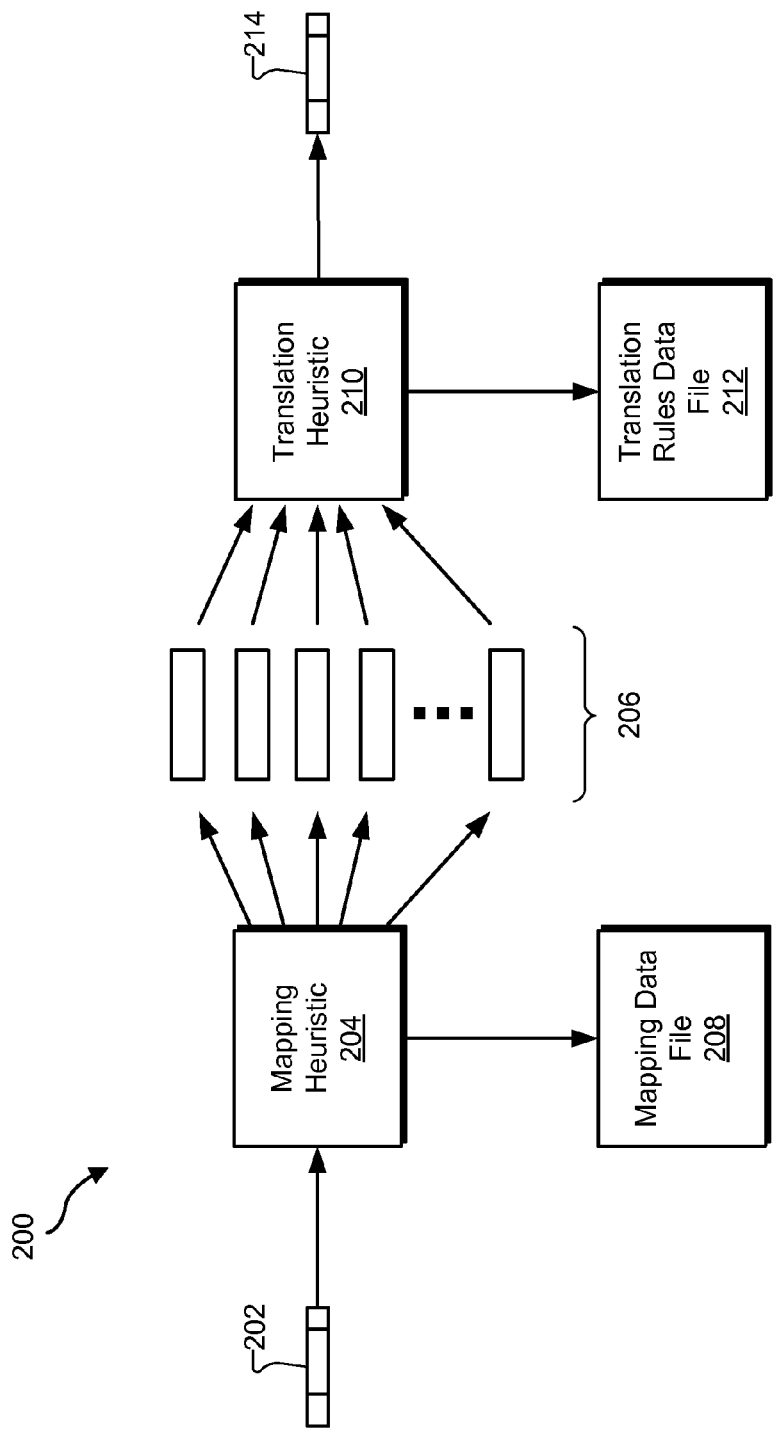
FIG. 2 illustrates an exemplary message conversion flow.

FIG. 2 illustrates an exemplary message conversion flow 200 that may be performed by system 100. As shown in FIG. 2, a network alarm message 202 may be received. Message input facility 102 may apply a predefined mapping heuristic 204 to network alarm message 202 to map content of network alarm message 202 to a plurality of fields 206 defined by a network universal message format. The predefined mapping heuristic 204 may identify and reference an appropriate mapping data file 208 included in mapping data 110 such that message input facility 102 in effect applies mapping data file 208 to network alarm message 202 to map content of network alarm message 202 to the plurality of field 206 of the network universal message format.

Conversion facility 104 may then apply a predefined translation heuristic 210 to network alarm message 202 to translate content of network alarm message 202 and populate the plurality of fields 206 defined by the network universal message format with the translated content. The predefined translation heuristic 210 may reference an appropriate translation rules data file 212 included in translation rules data 112 such that conversion facility 104 if effect applies translation rules data file 212 to network alarm message 202 to translate content of network alarm message 202 and populate the plurality of fields 206 defined by a network universal message format with the translated content.

A new network alarm message 214 is generated by the application of mapping heuristic 204 and translation heuristic 210 to network alarm message 202. New network alarm message 214 is defined in accordance with the network universal message format and represents network alarm message 202 in converted form (e.g., from a first network message format to the network universal message format).

Mapping data file 208 and translation rules data file 212 each may be associated with and selectively applied to network alarm messages defined in accordance with a particular message format. Mapping heuristic 204 and translation heuristic 210 may be configured to determine that network alarm message 202 is defined in accordance with the particular message format and identify and apply mapping data file 208 and translation rules data file 212, respectively, to network alarm message 202 to generate new network alarm message 214 defined in accordance with the network universal message format.

The selective application of appropriate data files to a network alarm message may facilitate convenient and non-intrusive operator management of system 100. For example, an operator of system 100 may be able to update mapping data file 208 within mapping data 110 and/or translation rules data file 212 within translation rules data 112 to modify how a network alarm message in a particular message format corresponding to the data files 208 and 212 is to be converted to a new network alarm message defined in accordance with a network universal message format. Additionally or alternatively, the operator of system 100 may be able to add a new mapping data file within mapping data 110 and/or a new translation rules data file within translation rules data 112 to expand the capability of system 100 to include a capability to convert a network alarm message in a new message format to a new network alarm message defined in accordance with the network universal message format. Such modifications and/or additions to mapping data 110 and/or rules data 112 may be made without having to modify one or more of message input facility 102, mapping heuristic 204, conversion facility 104, and translation heuristic 210. Accordingly, operations of system 100 and/or other operations of a wide area network (e.g., network surveillance operations) may continue uninterrupted while changes are made to mapping data 110 and/or rules data 112.

Returning to FIG. 1, system 100, including facilities 102-108, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices (e.g., network devices), and may employ any of a number of computer operating systems. Moreover, it will be recognized that although facilities 102-108 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, a DVD, any other optical medium, a RAM, a PROM, an EPROM, a FLASH-EEPROM, any other memory chip or cartridge, or any other medium from which a computer can read.

Figure 3:
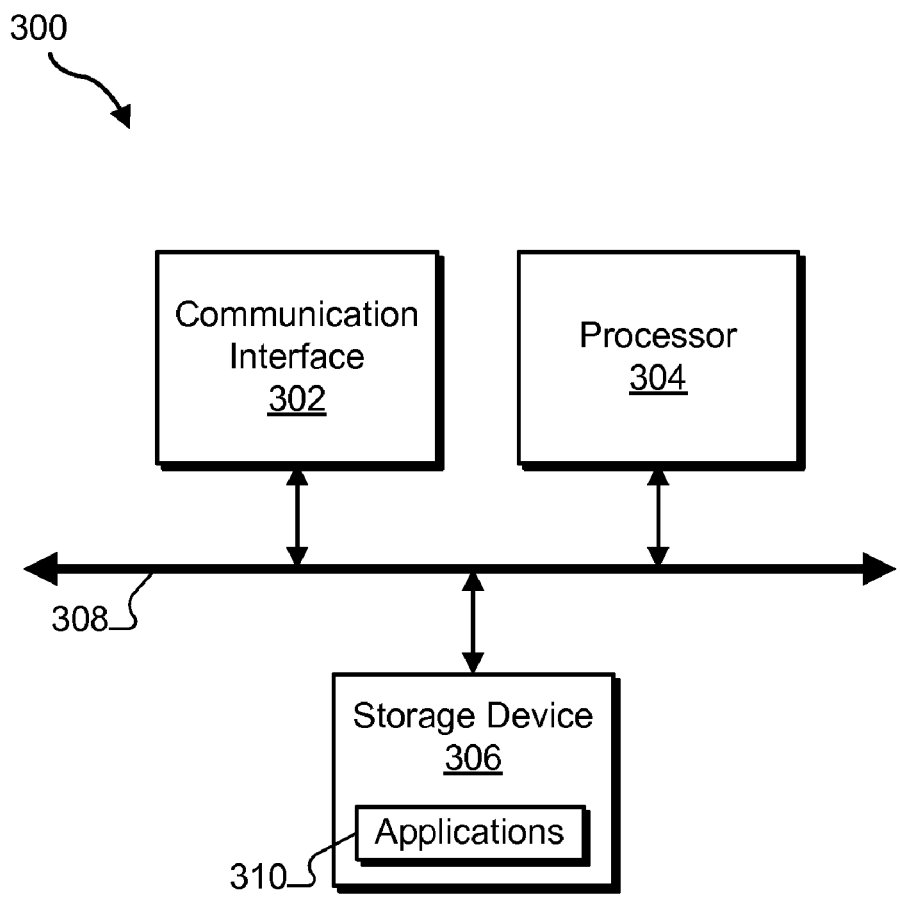
FIG. 3 illustrates an exemplary computing device implementing the system of FIG. 1.

FIG. 3 illustrates an exemplary computing device 300 in which system 100 may be implemented. As shown, computing device 300 may include a communication interface 302, a processor 304, and a storage device 306 communicatively coupled one to another via a communication infrastructure 308. The components of computing device 300 may communicate with one another, including sending data to and receiving data from one another, using any suitable communication technologies. Moreover, the components of computing device 300 may be implemented on any computing device or combination of computing devices, such as one or more servers, personal computers, network devices, telecommunications devices, or the like.

While an exemplary computing device 300 is shown in FIG. 3, the components illustrated in FIG. 3 are not intended to be limiting. Additional or alternative components may be used in other embodiments. Components of the computing device 300 shown in FIG. 3 will now be described in additional detail.

Communication interface 302 may be configured to communicate with one or more computing devices, including one or more computing devices (e.g., network elements) providing network alarm messages. Examples of communication interface 302 may include, without limitation, a wired network interface (such as a network interface card), a wireless network interface (such as a wireless network interface card), a modem, and any other suitable interface. Communication interface 302 may be configured to utilize any suitable communication media, protocols, formats, and/or technologies to provide an interface for communicating with one or more sources of network alarm messages.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data and/or communication signals for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform one or more of the operations described herein may be stored within storage device 306. In some examples, data may be arranged in one or more databases residing within storage device 306.

In some examples, message input facility 102, conversion facility 104, message output facility 106, and/or storage facility 108 may be implemented by or within one or more components of computing device 300. For example, one or more applications 310 residing within storage device 306 may be configured to direct processor 304 to perform one or more processes or functions associated with message input facility 102, conversion facility 104, and/or message output facility 106. Likewise, storage facility 108 may be implemented by or within storage device 306. For example, mapping data 110 and/or translation rules data 112 may be stored within storage device 306.

Figure 4:
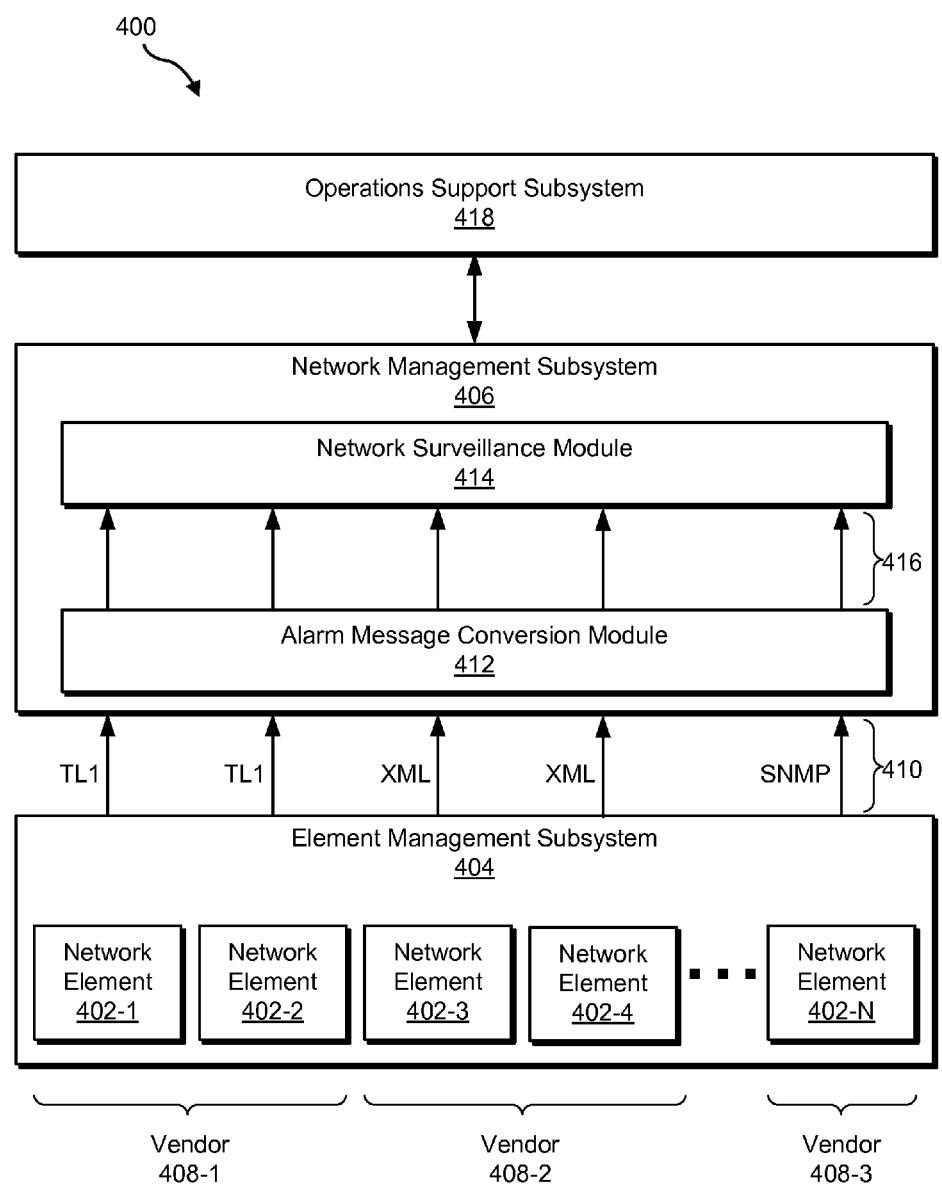
FIG. 4 illustrates an exemplary network architecture system implementing one or more components of system of FIG. 1.

FIG. 4 illustrates an exemplary network architecture system 400 implementing one or more components of system 100 of FIG. 1. As shown in FIG. 4, network architecture system 400 (or simply "system 400") may include a plurality of network elements 402 (e.g., network elements 402-1 through 402-N), which may be configured to perform one or more network operations of a wide area network. In certain embodiments, for example, network elements 402 may perform one or more operations of a fiber-to-the-premises passive optical network.

As shown in FIG. 4, system 400 may include an element management subsystem 404, which may be configured to perform one or more operations for managing network elements 402. Element management subsystem 404 may provide an interface between network elements 402 and a network management subsystem 406, which may be configured to perform one or more operations for managing the wide area network. While a single element management subsystem 404 is shown in FIG. 4, this is illustrative only. Element management subsystem 404 may include a plurality of discrete element management subsystems respectively associated with various network elements 402 and/or subsets of network elements 402. For example, an element management subsystem may be provided for each of the network elements 402, or for a subset of the network elements 402.

Network elements 402 may be associated with various vendors. As shown in FIG. 4, for example, network elements 402-1 and 402-2 may be provided by a first vendor 408-1, network elements 402-3 and 402-4 may be provided by a second vendor 408-2, and network element 402-N may be provided by a third vendor 408-3. Accordingly, one or more operations of network elements 402 and/or corresponding element management subsystems may be vendor specific and consequently heterogeneous across the wide area network.

As an example, network elements 402 may utilize different messaging formats. For example, network elements 402 provided by different vendors may be configured to detect network alarms in the wide area network and generate and provide network alarm messages descriptive of the network alarms in accordance with different message formats. In FIG. 4, network alarm messages 410 provided to network management subsystem 406 by network elements 402 include TL1 formatted messages provided by network elements 402-1 and 402-2, XML formatted messages provided by network elements 402-3, and SNMP formatted messages provided by network element 402-N.

Network management subsystem 406 may receive network alarm messages 410 from network elements 402 and/or element management subsystem 404. As shown in FIG. 4, network management subsystem 406 may include an alarm message conversion module 412 (or simply "conversion module 412") and a network surveillance module 414 (or simply "surveillance module 414"). Conversion module 412 may be configured to perform any of the operations of system 100 described herein, including receiving network alarm messages 410 provided by network elements 402, converting network alarm messages 410 from various message formats to a network universal message format to generate new, converted network alarm messages 416 defined in accordance with the network universal message format, and providing (e.g., outputting) the converted network alarm messages 416 defined in accordance with the network universal message format for further processing. An exemplary network universal message format and conversions from TL1, XML, and SNMP message formats to the exemplary network universal message format are described in more detail further below.

As shown in FIG. 4, conversion module 412 may generate and provide network alarm messages 416 in the network universal message format to network surveillance module 414. Network surveillance module 414, which may perform one or more operations for monitoring the wide area network, may be configured to process and use network alarm messages 416 in the network universal message format to conduct surveillance of the wide area network. For example, surveillance module 414 may be configured to interpret the network alarm messages 416 and perform a root-cause analysis based at least in part on the network alarm messages 416. The root-cause analysis may include performance of any operations configured to help determine a root cause of one or more detected alarms in the wide area network. From the root-cause analysis, surveillance module 414 may detect a condition in the wide area network and, when appropriate, initiate at least one remedial action configured to remedy the condition in the wide area network.

To illustrate, one or more network elements 402 and/or element management subsystem 404 may detect loss of connectivity to customer premises equipment (e.g., connectivity to one or more broadband home routers and/or set-top-box devices) and generate and output network alarm messages 410 to network management subsystem 406. Conversion module 412 may receive and convert the network alarm messages 410, as described above, to generate network alarm messages 416 defined in accordance with the network universal message format. Conversion module 412 may provide data representative of network alarm messages 416 to surveillance module 414, which may interpret and use the network alarm messages 416 to monitor conditions of the wide area network. In certain examples, surveillance module 414 may use the network alarm messages 416 in a root-cause analysis to determine a root cause of the alarms detected by network elements 402 and/or element management subsystem 404. From the root-cause analysis, surveillance module 414 may determine based on the network alarm messages 416 that a network transmission line has failed (e.g., been accidentally severed). In response, surveillance module 414 may communicate with an operations support subsystem 418 to initiate one or more remedial actions. For example, operations support subsystem 418 may be configured to perform one or more operations to issue a repair ticket and dispatch a service technician to repair the failed line.

As described above, conversion module 412 may convert heterogeneously formatted network alarm messages 410 to homogenously formatted network alarm messages 416 that are defined in accordance with a network universal message format. Significantly, because conversion module 412 provides homogenously formatted network alarm messages 416 to surveillance module 414, surveillance module 414 need not be configured to interpret a variety of network alarm message formats employed by network elements 402. Hence, the complexity and/or operator management of surveillance module 414 may be simplified. Moreover, conversion module 412 (e.g., one or more settings of conversion module 412) may be modified during runtime of surveillance module 414 and/or network management subsystem 406 without having to interrupt operation of surveillance module 414 and/or network management subsystem 406. Conversion module 412 (e.g., one or more settings of conversion module 412) may be modified to be able to convert a certain message format to the network universal message format as may suit a particular implementation without having to modify surveillance module 414 to handle the conversion.

An exemplary network universal message format will now be described. FIG. 5 illustrates a table 500 defining an exemplary network universal message format. As shown in FIG. 5, the network universal message format may include a plurality of fields depicted in a "message attribute" column 502 of table 500. The fields may be defined to be of the types indicated in a "type" column 504 of table 500. Table 500 further includes a "description" column 506 indicating descriptions of the fields. As illustrated in FIG. 5, the fields of the network universal message format may include an element management system IP address (e.g., an IP address of element management subsystem 404 of FIG. 4) field ("EMSIP"), a network element target identifier or IP address (e.g., an IP address of a network element 402 from which an alarm message is received) field ("NETID"), a network element type alarm source field ("ALARMSOURCE") indicating a type of network element 402 that provided a network alarm message, an affected entity details field ("SUBNEADDRESS") indicating one or more network nodes affected by an alarm, an alarm severity field ("SEVERITY") indicating a severity level of an alarm, a tagged value field ("ATAG"), an access identifier type field ("AIDTYPE") indicating a type of access identifier, an access identifier field ("AID") indicating an access identifier for an object affected by an alarm, an alarm generation time field ("GENERATIONTIME") indicating a time when an alarm message was received (e.g., by network management subsystem 404), an alarm condition type field ("CONDTYPE") indicating a condition type code for an alarm, an alarm description field ("DESC") including a description of an alarm, a service affecting field ("SERVICE-AFFECT") indicating whether a service (e.g., a service provided over a wide area network) is affected by an alarm, a vendor unique location identifier field ("LOCATION"), an internal and/or reserved field ("DIRECTION"), a category field ("CATEGORY") specifying whether a message is associated with an alarm category or an event category, and a message identifier field ("RAWMSGID") including a unique identifier for a message.

The exemplary network universal message format illustrated in FIG. 5 may be defined to include fields of types that facilitate conversion of messages of a wide variety of formats to messages defined in accordance with the network universal message format. Exemplary conversions from several message formats to the exemplary network universal message format illustrated in FIG. 5 will now be described.

Figure 6:
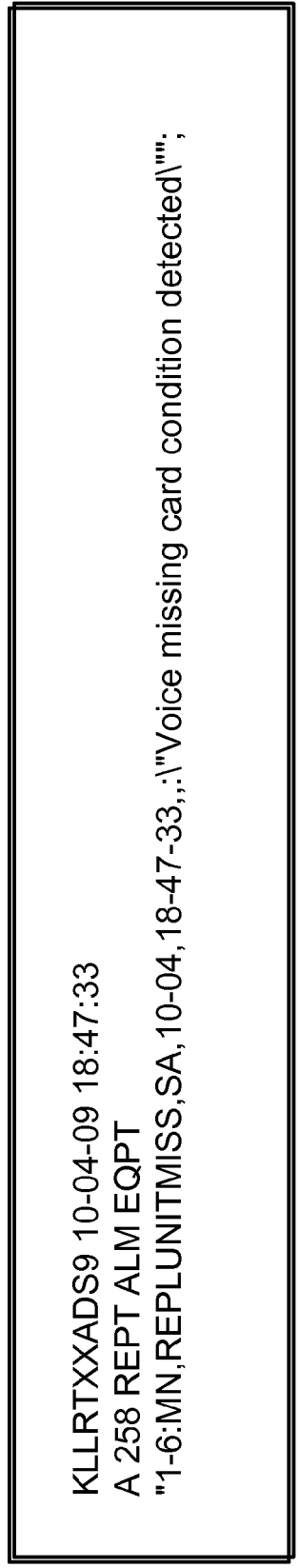
FIG. 6 illustrates an exemplary Transaction Language 1 ("TL1") formatted message.

FIG. 6 illustrates an exemplary TL1 formatted message 600 (or simply "TL1 message 600"), which is defined in accordance with an industry standard based TL1 format. As shown in FIG. 6, TL1 message 600 indicates that a missing voice card condition has been detected in the wide area network.

TL1 message 600 may be converted from TL1 based message format to the network universal message format by mapping and translating the content of TL1 message as described above. FIG. 7 illustrates a table 700 showing an exemplary mapping of TL1 message 600 to the network universal message format. As shown, table 700 may include a "TL1 message value" column 702 indicating values included in TL1 message 600, a "converted message attribute" column 704 indicating fields of the network universal message format to which the values in the TL1 message 600 are mapped, and a "converted message translated value" column 706 indicating values populated in the fields of the network universal message format based on predefined translation rules for translating values of the TL1 message 600 to the network universal message format. As depicted in column 706, certain values may be translated from the TL1 message 600, certain values may be derived from a translation rule associated with the TL1 message 600, and other values may be derived by system 100. For example, system 100 may generate a unique identifier for the new message and populate the "RAWMSGID" field with the unique identifier.

As another example, FIG. 8 illustrates an exemplary XML formatted message 800 (or simply "XML message 800"), which is defined in accordance with an XML based format. As shown in FIG. 8, XML message 800 indicates that a Dynamic Host Configuration Protocol ("DHCP") failure for a lack of an IP lease has been detected in the wide area network.

XML message 800 may be converted from XML based message format to the network universal message format by mapping and translating the content of XML message as described above. FIG. 9 illustrates a table 900 showing an exemplary mapping of XML message 800 to the network universal message format. As shown, table 900 may include an "XML message value" column 902 indicating values included in XML message 800, a "converted message attribute" column 904 indicating fields of the network universal message format to which the values in the XML message 800 are mapped, and a "converted message translated value" column 906 indicating values populated in the fields of the network universal message format based on predefined translation rules for translating values of the XML message 800 to the network universal message format. As depicted in column 906, certain values may be translated from the XML message 800, certain values may be derived from a translation rule associated with the XML message 800, and other values may be derived by system 100. For example, system 100 may generate a unique identifier for the new message and populate the "RAWMSGID" field with the unique identifier.

As another example, FIG. 10 illustrates an exemplary SNMP formatted message 1000 (or simply "SNMP message 1000"), which is defined in accordance with an SNMP based format. SNMP message 1000 indicates that an alarm such as a voltage of a power supply exceeding a threshold has been detected in the wide area network.

Figure 11:
FIG. 11 illustrates a table showing an exemplary mapping of the SNMP message of FIG. 10 to the network universal message format of FIG. 5.

SNMP message 1000 may be converted from SNMP based message format to the network universal message format by mapping and translating the content of SNMP message as described above. FIG. 11 illustrates a table 1100 showing an exemplary mapping of SNMP message 1000 to the network universal message format. As shown, table 1100 may include an "SNMP message value" column 1102 indicating values included in SNMP message 1000, a "converted message attribute" column 1104 indicating fields of the network universal message format to which the values in the SNMP message 1000 are mapped, and a "converted message translated value" column 1106 indicating values populated in the fields of the network universal message format based on predefined translation rules for translating values of the SNMP message 1000 to the network universal message format. As depicted in column 1106, certain values may be translated from the SNMP message 1000, certain values may be derived from a translation rule associated with the SNMP message 1000, and other values may be derived by system 100. For example, system 100 may generate a unique identifier for the new message and populate the "RAWMSGID" field with the unique identifier.

Figure 12:
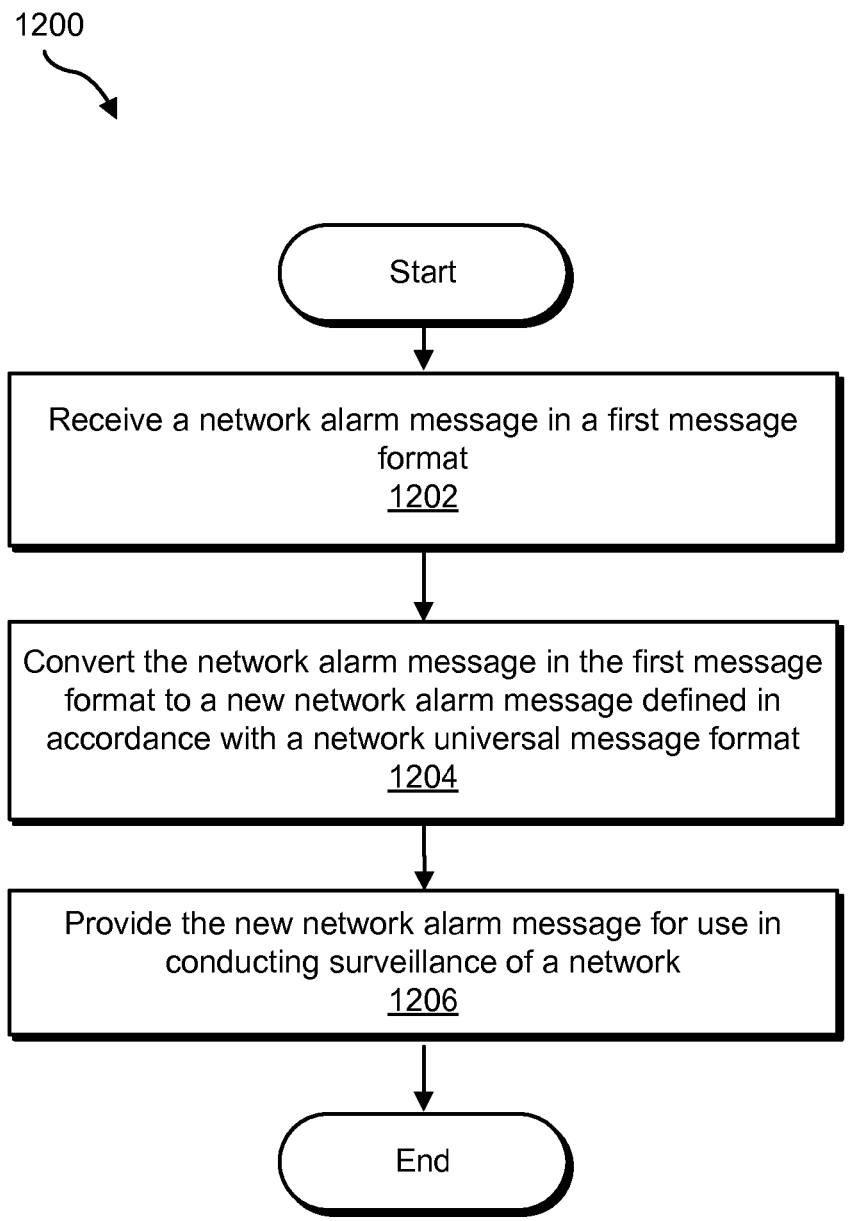
FIG. 12 illustrates an exemplary network alarm message processing method.

FIG. 12 illustrates an exemplary network alarm message processing method 1200. While FIG. 12 illustrates exemplary steps according to one embodiment, other embodiments may omit, add to, reorder, and/or modify any of the steps shown in FIG. 12. In certain embodiments, one or more of the steps shown in FIG. 12 may be performed by one or more components of system 100, computing device 300, and/or system 400.

In step 1202, a network alarm message is received in a first message format. For example, system 100 may receive a network alarm message in the first message format from a network element of a network such as a wide area network, as described above.

In step 1204, the network alarm message in the first message format is converted to a new network alarm message defined in accordance with a network universal message format. For example, system 100 may convert the network alarm message in the first message format to the new network alarm message defined in accordance with the network universal message format in any of the ways described above.

In step 1206, the new network alarm message is provided for use in conducting surveillance of a network such as a wide area network. For example, system 100 may provide the new network alarm message in the network universal message format to a network surveillance application such as may be included in or implemented by surveillance module 414 shown in FIG. 4. The network surveillance application may interpret and use the new network alarm message to conduct surveillance of the network in any of the ways described above.

One or more of the steps shown in FIG. 12 may be repeated. For example, steps 1202, 1204, and 1206 may be repeated for each network alarm message provided by and received from a network element in the network. For instance, another network alarm message may be received in a second message format (step 1202). The other network alarm message in the second message format may be converted to another new network alarm message defined in accordance with the network universal message format (step 1204). The other new network alarm message may be provided for use in the conducting of surveillance of the network (step 1206). In this or a similar manner, one or more of the steps shown in FIG. 12 may be repeated such that a plurality of network alarm messages defined in accordance with a plurality of heterogeneous message formats may be received and converted to a plurality of new network alarm messages defined in accordance with the network universal message format. The new network alarm messages in the network universal message format may be provided for use in conducting surveillance of the network.

Figure 13:
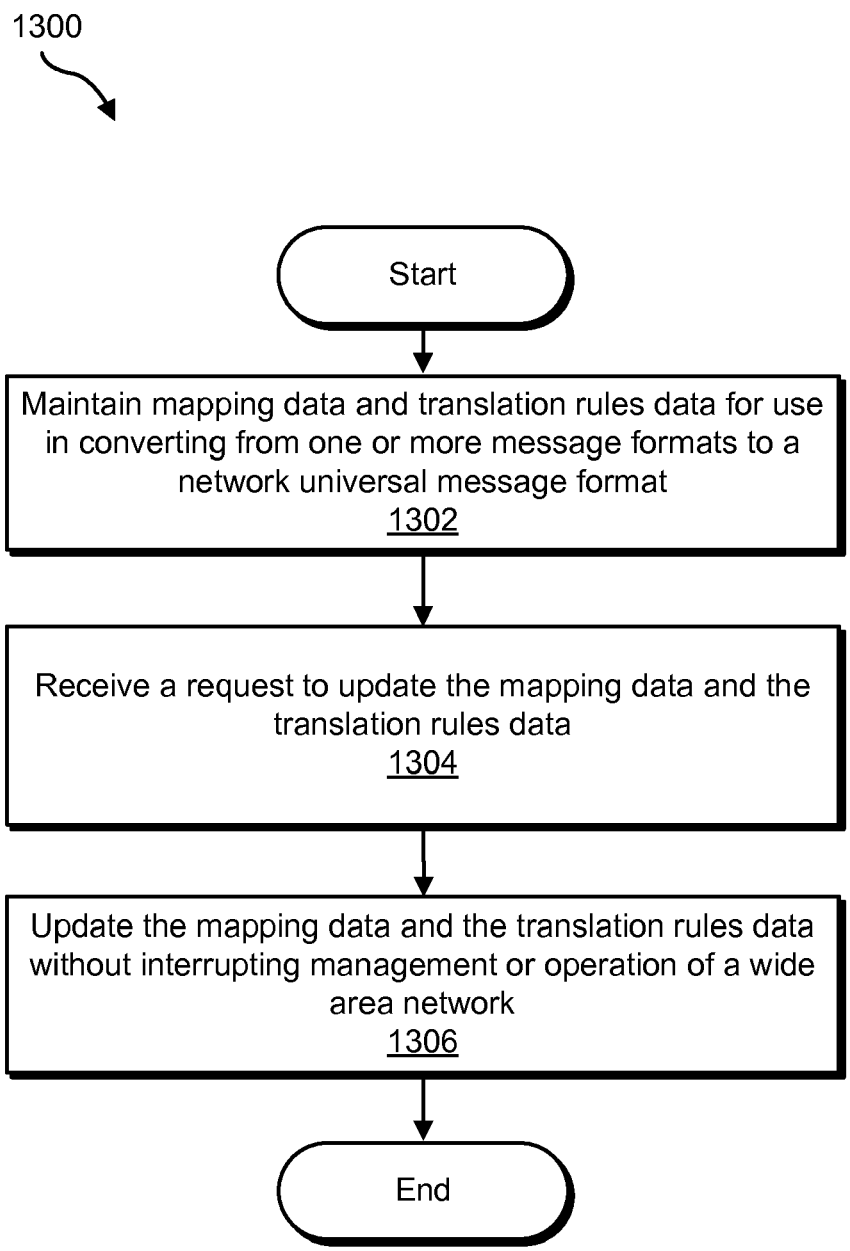
FIG. 13 illustrates an exemplary network alarm message conversion updating method.

FIG. 13 illustrates an exemplary network alarm message conversion updating method 1300. While FIG. 13 illustrates exemplary steps according to one embodiment, other embodiments may omit, add to, reorder, and/or modify any of the steps shown in FIG. 13. In certain embodiments, one or more of the steps shown in FIG. 13 may be performed by one or more components of system 100, computing device 300, and/or system 400.

In step 1302, mapping data and translation rules data are maintained for use in converting network messages from one or more message formats to a network universal message format. For example, system 100 may maintain mapping data 110 and translation rules data 112 in storage facility 108 for use in converting network messages from one or more message formats to the network universal message format.

In step 1304, a request to update the mapping data and the translation rules data is received. For example, system 100 may receive data representative of a request provided by an operator of a wide area network to update the mapping data 110 and translation rules data 112 stored in storage facility 108. To this end, system 100 may be configured to provide a user interface through which the operator of the wide area network may provide the request to update the mapping data and the translucent translation rules data as well as data representative of any requested updates.

In step 1306, the mapping data and the translation rules data are updated without interrupting management or operation of a wide area network. For example, in response to the request received in step 1304, system 100 may update mapping data 110 and translation rules data 112 in storage facility 108 to reflect the update. In certain examples, the update may include a modification of one or more mapping data files included in mapping data 110 and one or more translation rules data files included in translation rules data 112 in storage facility 108. In certain other examples, the update may include an addition of a new mapping data file to mapping data 110 and an addition of a new translation rules data file to translation rule data 112 in storage facility 108. In certain other examples, the update may include a deletion of a mapping data file from mapping data 110 and a deletion of a translation rules data file from translation rules data 112 in storage facility 108. Such updates may be performed in step 1306 without interrupting management or operation of the wide area network, including without interrupting surveillance of the wide area network.

One or more of the steps shown in FIG. 13 may be repeated. For example, steps 1304 and 1306 may be repeated for each update to mapping data 110 and/or translation rules data 112 in storage facility 108.

While the exemplary systems and methods described above are directed to processing network alarm messages in a context of managing (e.g., conducting surveillance of) a wide area network, one or more of the principles described herein may be applied to process other types of network messages associated with management of a wide area network or any other type of network or one or more network devices. For example, one or more of the systems and methods described above may be implemented in one or more network elements in a long-haul network, a metro network (e.g., a metro access network or a metro core network), a core network, or any other network or a portion of a network.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a network alarm message processing system, a network alarm message provided by a network element of a network, the network alarm message being in a first message format;
    converting, by the network alarm message processing system, the network alarm message in the first message format to a new network alarm message defined in accordance with a network universal message format, the converting comprising:
        mapping content of the network alarm message in the first message format to a plurality of fields of the network universal message format based on a mapping data file associated with the first message format,
        translating the content of the network alarm message in the first message format based on a translation rules data file associated with the first message format, and
        populating the plurality of fields with the translated content to generate the new network alarm message in the network universal message format;
    providing, by the network alarm message processing system, the new network alarm message in the network universal message format to a network surveillance module, wherein the network surveillance module conducts surveillance of the network by performing a root-cause analysis based at least in part on the new network alarm message in the network universal message format;
    receiving, by the network alarm message processing system, a request to add a new mapping data file and a new translation rules data file to a storage facility of the network alarm message processing system, the new mapping data file and the new translation rules data file associated with a second message format; and
    adding, by the network alarm message processing system, the new mapping data file and the new translation rules data file to the storage facility for use in translating one or more network alarm messages from the second message format to the network universal message format, wherein the adding of the new mapping data file and the new translation rules data file is performed without interrupting surveillance of the network.

2. The method of claim 1, further comprising:
    receiving, by the network alarm message processing system, another network alarm message provided by another network element of the network, the another network alarm message being in the second message format;
    converting, by the network alarm message processing system, the another network alarm message in the second message format to another new network alarm message in the network universal message format, the converting comprising:
        mapping content of the another network alarm message in the second message format to the plurality of fields of the network universal message format based on the new mapping data file associated with the second message format,
        translating the content of the network alarm message in the second message format based on the new translation rules data file associated with the second message format, and
        populating the plurality of fields with the translated content from the network alarm message in the second message format to generate the another new network alarm message in the network universal message format; and
    providing, by the network alarm message processing system, the another new network alarm message in the network universal message format to the network surveillance module.

3. The method of claim 1, embodied as computer-executable instructions on at least one tangible non-transitory computer-readable medium.

4. A system comprising:
    a network alarm input message processing facility including at least one hardware processor configured to:
        receive a network alarm message provided by a network element of a wide area network, the network alarm message being in a first message format, and
        map content of the network alarm message to a plurality of fields of a network universal message format based on a mapping data file associated with the first message format;
    a network alarm message conversion facility communicatively coupled to the network alarm input message processing facility and configured to:
        translate the content of the network alarm message in the first message format based on a translation rules data file associated with the first message format, and
        populate the plurality of fields with the translated content to generate a new network alarm message in the network universal message format;
    a network alarm output message processing facility communicatively coupled to the network alarm message conversion facility and configured to provide the new network alarm message in the network universal message format to a network surveillance application, wherein the network surveillance application is configured to conduct surveillance of the wide area network by interpreting the new network alarm message in the network universal message format and performing a root-cause analysis based at least in part on the interpreted new network alarm message in the network universal message format;
    a storage facility communicatively coupled to the network alarm input message processing facility and the network alarm message conversion facility, the storage facility configured to:
        store the mapping data file and the translation rules data file associated with the first message format,
        receive a request to add a new mapping data file and a new translation rules data file to the storage facility, the new mapping data file and the new translation rules data file associated with a second message format, and add the new mapping data file and the new translation rules data file to the storage facility for use in translating one or more network alarm messages from the second message format to the network universal message format, wherein the addition of the new mapping data file and the new translation rules data file to the storage facility is performed without interrupting surveillance of the network.

5. The system of claim 4, wherein:
the network alarm input message processing facility is further configured to
receive another network alarm message provided by another network element of the wide area network, the another network alarm message being in the second message format, and
map content of the another network alarm message to the plurality of fields of the network universal message format;
the network alarm message conversion facility is further configured to:
translate the content of the another network alarm message in the second message format, and
populate the plurality of fields with the translated content from the network alarm message in the second message format to generate another new network alarm message in the network universal message format; and
the network alarm output message processing facility is further configured to provide the another new network alarm message in the network universal message format to the network surveillance application.

6. The system of claim 5, wherein:
the first message format is specific to a first vendor that provided the network element; and
the second message format is specific to a second vendor that provided the another network element.

7. The system of claim 4, wherein the wide area network comprises at least one of a fiber-to-the-premises network and an optical network.

8. The system of claim 4, wherein the first message format comprises one of a Transaction Language 1 ("TL1") message format, an Extensible Markup Language ("XML") message format, and a Simple Network Management Protocol ("SNMP") message format.

9. The system of claim 4, wherein the network universal message format specifies a plurality of fields comprising at least an alarm source field for data representing a source of an alarm, a sub-node field for data representing at least one sub-node network element affected by the alarm, and an alarm severity field for data representing a severity level of the alarm.

10. A system comprising:
a network surveillance module of a network management subsystem configured to manage a wide area network, the network surveillance module configured to conduct surveillance of the wide area network; and
an alarm message conversion module of the network management subsystem, the alarm message conversion module including at least one hardware processor configured to:
receive a plurality of network alarm messages provided by a plurality of network elements of the wide area network, the plurality of network alarm messages being in a plurality of heterogeneous message formats,
convert the plurality of network alarm messages in the plurality of heterogeneous message formats to a plurality of new network alarm messages in a network universal message format based on a plurality of mapping data files and a plurality of translation rules data files associated with the plurality of heterogeneous message formats,
provide the plurality of new network alarm messages in the network universal message format to the network surveillance module for use by the network surveillance module in conducting the surveillance of the wide area network, wherein the network surveillance module is configured to conduct the surveillance of the wide area network by interpreting the plurality of new network alarm messages in the network universal message format and performing a root-cause analysis based at least in part on the interpreted new network alarm messages in the network universal message format,
receive a request to add a new mapping data file and a new translation rules data file associated with a new message format to the plurality of mapping data files and the plurality of translation rules data files associated with the plurality of heterogeneous message formats, and
add the new mapping data file and the new translation rules data file associated with the new message format to the plurality of mapping data files and the plurality of translation rules data files associated with the plurality of heterogeneous message formats for use by the alarm message conversion module in translating one or more network alarm messages from the new message format to the network universal message format, wherein the addition of the new mapping data file and the new translation rules data file is performed without interrupting the surveillance of the wide area network.

11. The system of claim 10, wherein the alarm message conversion module is configured to convert the plurality of network alarm messages in the plurality of heterogeneous message formats to the plurality of new network alarm messages in the network universal message format by, for each network alarm message in the plurality of network alarm messages,
mapping content of the network alarm message to a plurality of fields of the network universal message format based on a mapping data file included in the plurality of mapping data files and associated with a message format included in the plurality of heterogeneous message formats and corresponding to the network alarm message,
translating the content of the network alarm message based on a translation rules data file included in the plurality of translation rules data files and associated with the message format corresponding to the network alarm message, and
populating the plurality of fields with the translated content to generate a new network alarm message in the network universal message format.

12. The system of claim 10, wherein each message format in the plurality of heterogeneous message formats is specific to a different vendor.

13. The system of claim 10, wherein the wide area network comprises at least one of a fiber-to-the-premises network and an optical network.

14. The system of claim 10, wherein the plurality of heterogeneous message formats comprises a Transaction Language 1 ("TL1") message format, an Extensible Markup Language ("XML") message format, and a Simple Network Management Protocol ("SNMP") message format.

15. The system of claim 10, wherein the network surveillance module is further configured to
  detect a condition in the wide area network based on the root-cause analysis, and
  initiate at least one remedial action configured to remedy the condition in the wide area network.

* * * * *